United States Patent
Delport et al.

(10) Patent No.: US 9,593,668 B2
(45) Date of Patent: Mar. 14, 2017

(54) METHODS AND SYSTEMS FOR REDUCING AMPLITUDE MODULATION IN WIND TURBINES

(71) Applicant: General Electric Company, Schenectady, NY (US)

(72) Inventors: Sara Simonne L. Delport, München (DE); Saskia Gerarda Honhoff, Salzbergen (DE)

(73) Assignee: General Electric Company, Niskayuna, NY (US)

( * ) Notice: Subject to any disclaimer, the term of this patent is extended or adjusted under 35 U.S.C. 154(b) by 698 days.

(21) Appl. No.: 14/022,502

(22) Filed: Sep. 10, 2013

(65) Prior Publication Data

US 2015/0071778 A1 Mar. 12, 2015

(51) Int. Cl.
*F03D 7/02* (2006.01)
*F03D 7/04* (2006.01)

(52) U.S. Cl.
CPC ........... *F03D 7/0224* (2013.01); *F03D 7/024* (2013.01); *F03D 7/0296* (2013.01); *F03D 7/042* (2013.01); *F05B 2260/96* (2013.01); *F05B 2270/331* (2013.01); *F05B 2270/333* (2013.01); *F05B 2270/808* (2013.01); *Y02E 10/723* (2013.01)

(58) Field of Classification Search
CPC .............. F03D 7/0296; F05B 2270/331; F05B 2270/333; F05B 2270/808
See application file for complete search history.

(56) References Cited

U.S. PATENT DOCUMENTS

| 4,201,514 | A | 5/1980 | Huetter |
| 6,285,090 | B1 | 9/2001 | Brutsaert et al. |
| 7,004,724 | B2 | 2/2006 | Pierce et al. |
| 7,160,083 | B2 | 1/2007 | Pierce et al. |
| 7,569,945 | B2* | 8/2009 | Pedersen ............... F03D 7/0292 290/44 |
| 7,902,689 | B2* | 3/2011 | Kinzie ................... F03D 7/0224 290/44 |
| 7,927,070 | B2 | 4/2011 | Godsk et al. |
| 7,945,350 | B2* | 5/2011 | Kinzie ................... F03D 7/0224 181/211 |
| 7,988,414 | B2* | 8/2011 | Benito .................. F03D 7/0224 416/33 |

(Continued)

FOREIGN PATENT DOCUMENTS

| WO | 2007104306 A1 | 9/2007 |
| WO | 2010061255 A2 | 6/2010 |
| WO | 2012146252 A2 | 11/2012 |

OTHER PUBLICATIONS

Danish Office Action issued in connection with corresponding DK Application No. PA201470548 on Mar. 19, 2015.

(Continued)

*Primary Examiner* — John K Fristoe, Jr.
*Assistant Examiner* — Christopher R Legendre
(74) *Attorney, Agent, or Firm* — Ann M. Agosti

(57) ABSTRACT

A wind turbine system is presented. The wind turbine system includes a rotor comprising a plurality of blades and a hub, and a turbine controller configured to reduce an abnormal amplitude modulation of the wind turbine by adjusting pitch angles of the plurality of blades during a rotation of the rotor based upon aerodynamic loads acting on the rotor.

13 Claims, 6 Drawing Sheets

(56) References Cited

U.S. PATENT DOCUMENTS

| | | | |
|---|---|---|---|
| 8,096,762 | B2 | 1/2012 | Risager et al. |
| 8,100,647 | B2 | 1/2012 | Godsk et al. |
| 8,215,907 | B2 * | 7/2012 | Kooijman ............ F03D 7/0212 416/1 |
| 8,222,757 | B2 | 7/2012 | Schulten |
| 8,231,344 | B2 * | 7/2012 | Kinzie ................ F03D 1/0608 416/1 |
| 8,277,185 | B2 | 10/2012 | Menke |
| 8,287,228 | B2 | 10/2012 | Kinzie et al. |
| 8,303,249 | B2 | 11/2012 | Haans et al. |
| 8,398,369 | B2 | 3/2013 | Rebsdorf et al. |
| 9,163,611 | B2 * | 10/2015 | Santiago Benito ... F03D 7/0224 |
| 2007/0018457 | A1 | 1/2007 | Llorente |
| 2007/0031237 | A1 | 2/2007 | Bonnet |
| 2010/0004878 | A1 * | 1/2010 | Volanthen ............ F03D 1/065 702/42 |
| 2010/0021296 | A1 | 1/2010 | Nielsen |
| 2010/0098541 | A1 | 4/2010 | Benito et al. |
| 2010/0143119 | A1 | 6/2010 | Kooijman et al. |
| 2011/0173703 | A1 | 7/2011 | Kim et al. |
| 2011/0173771 | A1 | 7/2011 | Park et al. |
| 2012/0025530 | A1 | 2/2012 | Kinzie et al. |
| 2012/0027591 | A1 | 2/2012 | Kinzie et al. |
| 2012/0027592 | A1 | 2/2012 | Kinzie et al. |
| 2014/0142888 | A1 * | 5/2014 | Duncan ................ F03D 7/0296 702/150 |
| 2015/0071778 | A1 * | 3/2015 | Delport ................ F03D 7/0224 416/1 |

OTHER PUBLICATIONS

Jeremy Bass; "Acoustic Emissions Acceptance Criteria for Den Brook Wind Farm"; RES, Document Reference: 01531-005605 Issue: 01—Approved; Apr. 23, 2013, 4 Pages.

Jeremy Bass; "Acoustic Emissions Test Procedure for Den Brook Wind Farm"; RES, Document Reference: 01531-005604 Issue: 02—Approved; Apr. 23, 2013, 6 Pages.

D. Heimann et al.: "The wake of a wind turbine and its influence on sound propagation"; Fast Track Article 2011; Meteorologische Zeitschrift, Fast Track DOI 10.1127/0941-2948/2011/0273; 12 Pages.

Saskia Honhoff et al.; "Method and Apparatus for Wind Turbine Noise Reduction;" Pending U.S. Appl. No. 13/756,877, filed Feb. 1, 2013; 45 Pages.

Dietrich Heimann; "Numerische Simulationen zur Schallausbreitung im Nachlauf einer Windenergieanlage";DLR Institut für Physik der Atmosphäre; www.DLR.de • Folie 1 > Seminar TUM> D. Heimann > Jun. 26, 2012; 38 Pages.

Dietrich Heimann; "Numerical Simulations of Sound Propagation in the wake of a Wind Turbine"; DLR Institute of Atmospheric Physics; www.DLR.de • Slide 1 > Seminar TUM> D. Heimann > Jun. 26, 2012; 38Pages. (English translation of above Ref 5).

"Environmental Protection (Noise) Regulations 1997", pp. 1-47, Nov. 7, 2003.

* cited by examiner

METHODS AND SYSTEMS FOR REDUCING AMPLITUDE MODULATION IN WIND TURBINES

BACKGROUND

Wind power is considered one of the cleanest, most environment friendly energy sources presently available, and wind turbines have gained increased attention in this regard. A modern wind turbine typically includes a tower, a generator, a gearbox, a nacelle, and a rotor comprising one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the rotational energy (mechanical energy) to electrical energy that may be deployed to a utility grid.

During operation of the wind turbine, rotation of the rotor blades through air generates aerodynamic noise. Typically, the aerodynamic noise is driven by three factors including rotor design, rotor speed, and an angle of attack distribution of flow over the rotor of the wind turbine. The angle of attack distribution of flow may change as the rotor turns, for example under conditions of high wind shear. In a part of a rotor plane that is impacted by high wind speed, the angle of attack is high, and thus the noise may be high. A high variation in the angle of attack may cause a variation in aerodynamic noise level, and result in amplitude modulation of the aerodynamic noise.

Due to the amplitude modulation of the aerodynamic noise, a "swooshing" or periodic pulsing sound is typically heard in near fields/habitation of the wind turbine (i.e., the area directly around the wind turbine). Such sounds are typically seen as a nuisance and, thus, regulations are typically put in place establishing maximum sound levels, measured in decibel (dB) for wind turbines operating around residential communities and other populated areas. As a result, wind turbines and wind parks are typically designed to operate below these maximum sound levels. Recently the regulations are extended to include a limit on the amplitude modulation.

Current research suggests that the peak-to-peak amplitude of the modulated noise generated by wind turbines may be higher at locations in far field/habitation (i.e. locations at a certain distance (e.g., 1-4 kilometers) away from the wind turbines) than in the near field due to propagation and/or directivity effects. Therefore, there is a risk that the wind turbines operating below the amplitude modulation limit in the near field may actually be exceeding this limit in the far field.

Various methods have been proposed for reducing the noise emissions of wind turbines. For example, it has been proposed to reduce aerodynamic noise by de-rating all of the wind turbines within a wind turbine farm in order to keep the wind turbines speeds low during time intervals (e.g., during nighttime or other times at which reduced noise is desired). However, such techniques do not reduce the amplitude modulation, and may reduce power produced by the de-rated wind turbines. Accordingly, a system and method for controlling the amplitude modulation of noise generated by wind turbines is desirable.

BRIEF DESCRIPTION

A wind turbine system is presented. The wind turbine system includes a rotor comprising a plurality of blades and a hub, and a turbine controller configured to reduce an abnormal amplitude modulation of the wind turbine by adjusting pitch angles of the plurality of blades during a rotation of the rotor based upon aerodynamic loads acting on the rotor.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
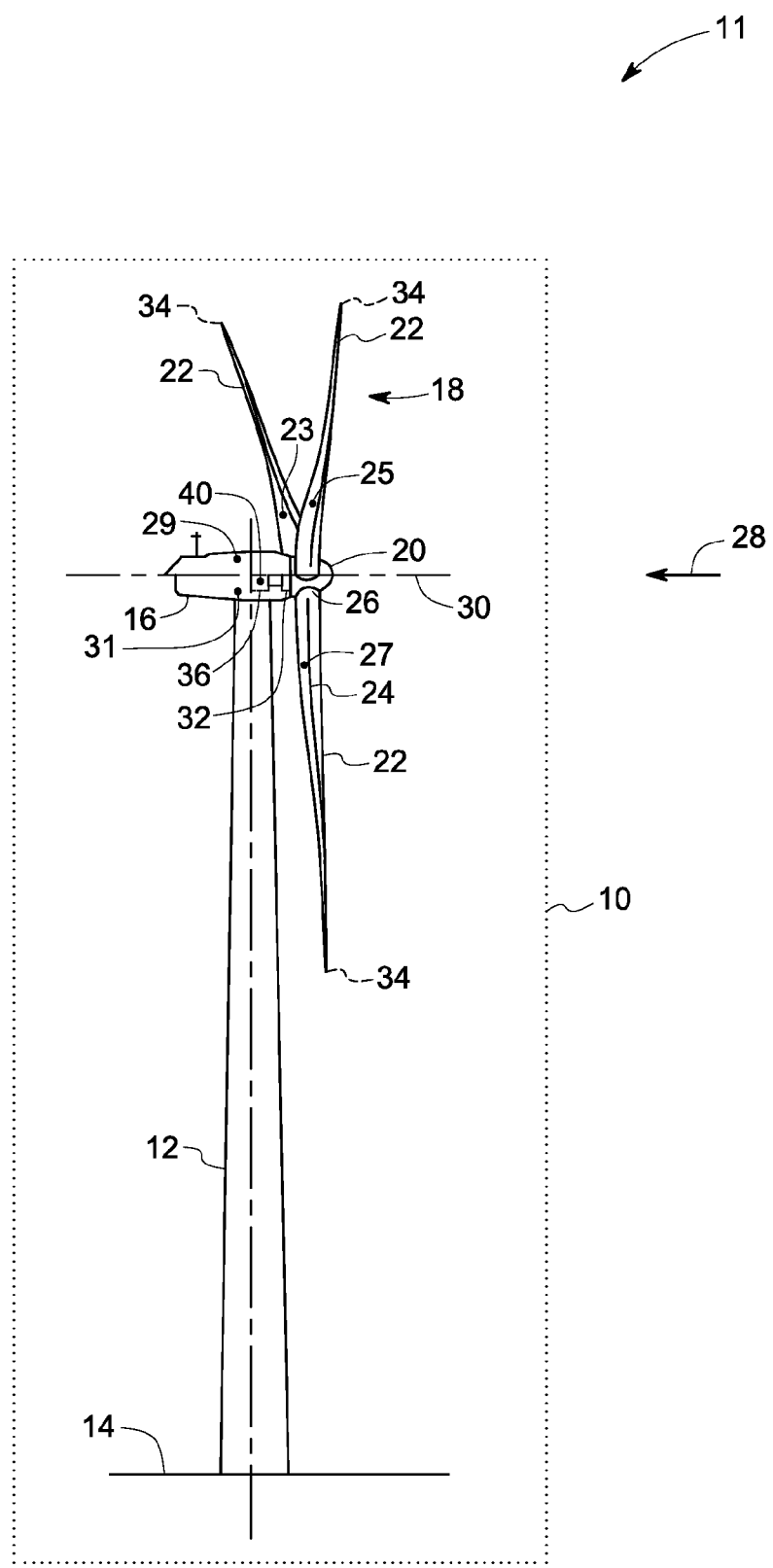
FIG. 1 is a perspective view of an exemplary wind turbine, in accordance with certain embodiments of the present techniques.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine and methods to reduce abnormal amplitude modulation in the wind turbine. As used herein, the term "abnormal amplitude modulation" is used to refer to a thumping noise created by the wind turbine during operation, or having an impulsive characteristic. As described in detail hereinafter, the present systems and methods reduce the abnormal amplitude modulation of the wind turbine based on aerodynamic loads acting on a rotor of the wind turbine. In certain embodiments, the present systems and methods reduce the abnormal amplitude modulation of the wind turbine based on the aerodynamic loads, positions of blades of the wind turbine during a rotation based upon details of a habitation, positions of blades with respect to a location of the habitation, position of the wind turbine with respect to the location of the habitation, direction of wind, wind shear, high aerodynamic loads, low aerodynamic loads, locations of the high aerodynamic loads, locations of the low aerodynamic loads, or combinations thereof.

The present systems and methods reduce the abnormal amplitude modulation of the wind turbine irrespective of a nature of wind shear acting on the wind turbine. For example, the present systems and methods reduce the abnormal amplitude modulation for standard logarithmic wind shear profile, inverse wind shear, waked conditions, or low-level jet. As used herein, the term "wind turbine" is intended to be representative of any device that generates rotational energy from wind energy, and more specifically, converts kinetic energy of wind into mechanical energy. As used herein, the term "aerodynamic loads" is used to refer to forces acting on a wind turbine due to relative velocity between the wind turbine and wind, wherein the relative velocity changes based on environmental conditions and the wind turbine operation. The aerodynamic loads, for example include loads that are caused by flow of wind around rotor blades of the wind turbine. The aerodynamic loads are typically generated at the rotor blades, but may affect the entire wind turbine. The aerodynamic loads, for example, include fatigue loads, extreme loads, asymmetric loads, and the like. Further, the aerodynamic loads may be measured at the rotor blades or at other location in the wind turbine, including but not limited to, a hub, a main shaft, a tower or a yaw bearing of the wind turbine.

Moreover, embodiments of the present disclosure are described with reference to a land-based three-blade wind turbine. It will be understood, however, that such a reference is merely exemplary and that the systems and methods described here may just as easily be implemented in floating wind turbines, offshore wind turbines, 2-blade wind turbines, or n-blade wind turbines without departing from the scope of the present disclosure.

Furthermore, embodiments of the present disclosure are described with reference to an individual wind turbine. However, it will be understood that the teachings of the present disclosure may be utilized for more than one wind turbine simultaneously or on an entire wind farm, without departing from the scope of the present disclosure.

FIG. 1 is a perspective view of an exemplary wind turbine system 11, in accordance with certain embodiments of the present techniques. In the exemplary embodiment, the wind turbine system 11 includes a wind turbine 10. The wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on the tower 12, and a rotor 18 that is coupled to the nacelle 16. The rotor 18 includes a rotatable hub 20 and at least one blade 22 coupled to and extending outward from the hub 20. In the exemplary embodiment, the rotor 18 has three blades 22. In an alternative embodiment, the rotor 18 includes more or less than three blades 22. In the exemplary embodiment, the tower 12 is fabricated from tubular steel to define a cavity (not shown in FIG. 1) between the support system 14 and the nacelle 16. In an alternative embodiment, the tower 12 is any suitable type of tower having any suitable height.

The blades 22 are spaced about the hub 20 to facilitate the rotating rotor 18 to enable kinetic energy to be transferred from wind into usable mechanical energy, and subsequently, electrical energy. The blades 22 are mated to the hub 20 by coupling a blade root portion 24 to the hub 20 at a plurality of load transfer regions 26. The load transfer regions 26 have a hub load transfer region and a blade load transfer region (both not shown in FIG. 1). Loads induced to rotor blades 22 are transferred to hub 20 via the load transfer regions 26.

As wind strikes the blades 22 from a direction 28, the rotor 18 is rotated about an axis of rotation 30. As the blades 22 are rotated and subjected to centrifugal forces, the blades 22 are also subjected to aerodynamic loads. With changing environmental conditions, the magnitude of aerodynamic loads varies. Also, with the changing environmental conditions the distribution of the aerodynamic loads acting on the rotor 18 varies. For example, in standard logarithmic wind shear profile conditions when wind velocity is higher towards an upper portion of the rotor 18, and the wind velocity is lower towards a lower portion of the rotor 18, the aerodynamic loads are higher on the upper portion of the rotor 18, and the aerodynamic loads are lower on the lower portion of the rotor 18. Similarly, in reverse wind shear conditions when wind velocity is higher towards the lower portion of the rotor 18, and the wind velocity is lower towards the upper portion of the rotor 18, the aerodynamic loads are lower on the upper portion of the rotor 18, and the aerodynamic loads are higher on the lower portion of the rotor 18. Again based on the environmental conditions sometimes the aerodynamic loads may be higher on one of the side portions of the rotor 18. The upper portion of the rotor 18, for example include positions of one or more of the blades 22 at or near 12 o'clock position. The lower portion of the rotor 18, for example, includes positions of one or more of the blades 22 at or near 6 o'clock position. The side portion of the rotor 18, for example, includes positions of one or more of the blades 22 at or near 9 o'clock position, or at or near 3 o'clock position. The aerodynamic loads result in bending moments of the blades 22, deflection of the blades 22, deformation of the hub 20, bending moments of a main shaft (not shown) in the wind turbine 10, deflection of a main shaft in the wind turbine 10 (not shown), and the like.

In one embodiment, one or more sensing devices 23, 25, 27, 29, 31 are disposed on or inside the wind turbine 10 to measure the aerodynamic loads or measure properties representative of the aerodynamic loads. In the presently contemplated configuration, the sensing devices 23, 25, 27 are located on the blades 22. Further, the sensing devices 29, 31 are located on the main shaft inside the nacelle 16. In the presently contemplated configuration, the sensors 29, 31 are proximity sensors that generate the measurement signals of bending or deflection of the main shaft, wherein the bending or deflection of the main shaft is representative of the aerodynamic loads acting on the rotor 18. In one embodiment, the sensing devices 23, 25, 27, 29, 31 measure the aerodynamic loads to generate aerodynamic signals (now shown) representative of the aerodynamic loads acting on the rotor 18. In another embodiment, the sensing devices 23, 25, 27, 29, 31 measure the properties to generate measurement signals (now shown) of the properties representative of the aerodynamic loads acting on the rotor 18. In the presently contemplated configuration, the sensing devices 23, 25, 27 generate the aerodynamic signals, and the sensing devices 29, 31 generate the measurement signals. It is noted that the aerodynamic signals do not require further processing (except processing required for noise reduction or to increase signal to noise ratio) to determine the aerodynamic loads acting on the rotor 18. In one embodiment, the measurement signals of the properties representative of the aerodynamic loads may require further processing to determine the aerodynamic loads. In alternative embodiments, the measurement signals of the properties representative of the aerodynamic loads may be used to determine approximate estimates of the aerodynamic loads without further processing. The properties, for example, include bending moments of the blades 22, deflection of the blades 22, deformation of the hub 20, bending moments of the main shaft (not shown) in the wind turbine 10, deflection of the main shaft (not shown), and a distance between a flange (not shown) of the main shaft in the wind turbine 10 and a reference surface (not shown). The sensing devices 23, 25, 27, 29, 31, for example, include a proximity sensor, a pressure sensor, a stall flaps sensor, a wool tufts sensor, a strain gauge sensor, a vibe optic sensor, a radio sensor, a sensor that measures displacement or strain of a main shaft in the wind turbine 10 using sensor technologies based on acoustic, optical, magnetic, capacitive or inductive field effects, or combinations thereof.

The wind turbine system 10 further includes a turbine controller 36. In the exemplary embodiment, the control system 36 is shown as being centralized within nacelle 16, however, the control system 36 may be a distributed system throughout the wind turbine 10, on the support system 14, within a wind farm, and/or at a remote control center. The turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels. The turbine controller 36 is in an operational communication with the sensing devices 23, 25, 27, 29, 31. The turbine controller 36 receives the aerodynamic signals and the measurement signals from the sensing devices 23, 25, 27, 29, 31. In one embodiment, the turbine controller 36 adjusts pitch angles of the blades 22 based upon the aerodynamic signals and/or measurement signals. The turbine controller 36 reduces the abnormal amplitude modulation of the wind turbine 10 by adjusting pitch angles of the blades 22 in a rotation of the rotor 18 based upon the aerodynamic signals and/or the measurement signals. The adjustment of the pitch angles includes dynamic pitch angles adjustment of the blades 22 in the rotation of the rotor.

In the presently contemplated configuration, the turbine controller 36 determines the aerodynamic loads acting on the rotor 18 based upon the aerodynamic signals and/or the measurement signals. In one embodiment, the processor 40 in the turbine controller 36 may determine the aerodynamic loads acting on the rotor 18 based upon the aerodynamic signals and the measurement signals. Subsequently, the turbine controller 36 reduces the abnormal amplitude modulation of the wind turbine 10 by adjusting the pitch angles of the blades 22 in a rotation of the rotor 18 based upon the aerodynamic loads acting on the rotor 18. The pitch angles are changed/adjusted about respective pitch axes 34 of the blades 22. During operation of the wind turbine 10, the pitch angles of the blades 22 may be adjusted towards feather or stall based on the aerodynamic loads. When a blade is pitched towards feather, the perspective of the blade relative to wind vectors provides a minimal surface area of the blade.

In one embodiment, the turbine controller 36 adjusts a pitch angle of each of the blades 22. In one embodiment, during operation of the wind turbine 10, the turbine controller 36 dynamically adjusts the pitch angles of the blades 22 based upon the aerodynamic loads. In other words, during operation of the wind turbine 10, the turbine controller 36 continuously adjusts the pitch angles of the blades 22 based upon the aerodynamic loads. In one embodiment, the turbine controller 36, for example, may simultaneously adjust the pitch angles of the blades 22. In another embodiment, the turbine controller 36 may separately adjust the pitch angles of the blades 22. In one embodiment, the turbine controller 36 dynamically and collectively adjusts the pitch angles of the blades 22 to alter an average of pitch angles of the blades 22. In another embodiment, the turbine controller 36 dynamically adjusts the pitch angles of the blades 22 to maintain the average of the pitch angles as constant. In certain embodiments 36, the turbine controller 36 generates control signals (not shown) to adjust the pitch angles of the blades 22. The control signals, for example may include information about a number of degrees adjustment required in the pitch angles of the blades 22.

The wind turbine 10 further includes a pitch adjustment system 32. The pitch adjustment system 32 is in an operational communication with the turbine controller 36. In the presently contemplated configuration, the pitch adjustment system 32 receives the control signals. The pitch adjustment system 32 adjusts the pitch angles of the blades 22 based upon the information contained in the control signals. It is noted that since the turbine controller 36 or the pitch adjustment system 32 adjusts the pitch angles of the blades 22 based on the aerodynamic loads, the turbine controller 36 can reduce the abnormal amplitude modulation of the wind turbine 10 in multiple and different wind shear conditions. For example, the turbine controller 36 reduces the abnormal amplitude modulation in standard logarithmic wind shear profile, standard logarithmic wind shear profile conditions, inverse wind shear, waked conditions, or low-level jet.

Figure 2:
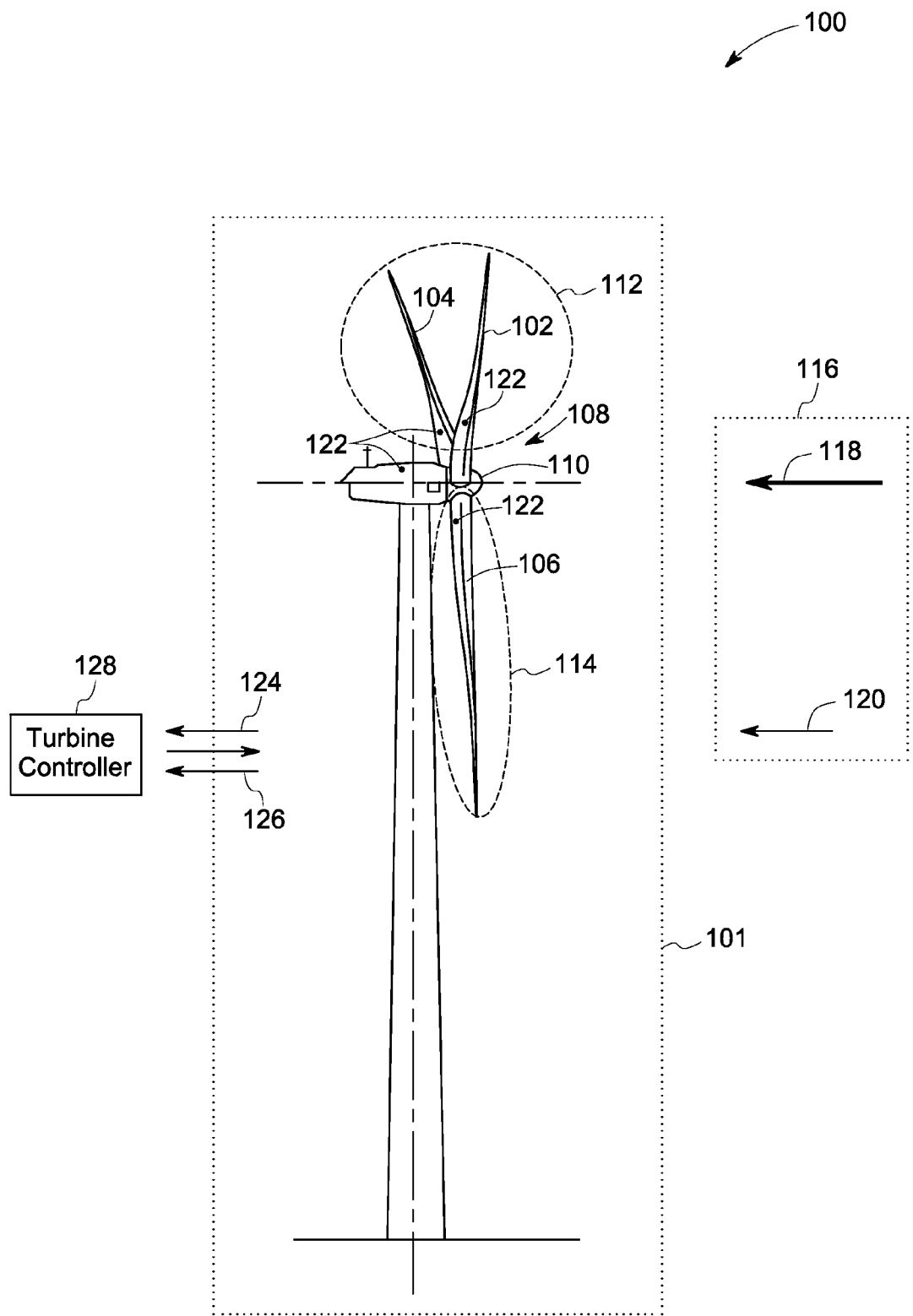
FIG. 2 is a perspective view of a wind turbine system to explain adjustment of pitch angles of blades, in accordance with one embodiment of the present systems.

FIG. 2 is a perspective view of a wind turbine system 100 to explain adjustment of pitch angles of blades, in accordance with one embodiment of the present systems. FIG. 2 shows position of blades 102, 104, 106 at a time stamp T. In one embodiment, FIG. 2 explains adjustment of the pitch angles of the blades 102, 104, 106 based on the position of the blades 102, 104, 106 at the time stamp T during operation of the wind turbine 101. The wind turbine system 100 includes a wind turbine 101 that includes a rotor 108. The rotor 108 includes the three blades 102, 104, 106 and a hub 110.

As shown in the presently contemplated configuration, at the time stamp T, the two blades 102, 104 are positioned towards an upper portion 112 of the rotor 108. At the time stamp T, the blade 106 is positioned towards a lower portion 114 of the rotor 108. Furthermore, in this embodiment, the wind turbine 101 is acted upon by a wind shear 116 at the time stamp T. Since the rotor 108 is acted upon by the wind shear 116, the blades 102, 104, 106 are acted upon by aerodynamic loads.

In the presently contemplated configuration, the wind shear 116 is a standard logarithmic wind shear profile. Accordingly at the time stamp T, due to the standard logarithmic wind shear profile 116, a higher wind velocity 118 is directed towards the upper portion 112 of the rotor 108 and a lower wind velocity 120 is directed towards the lower portion 114 of the rotor 108. As at the time stamp T, the blades 102, 104 are positioned in the upper portion of the rotor 108, the higher wind velocity 118 strikes the blades 102, 104. Furthermore, as at the time stamp T, as the blade 106 is positioned in the lower portion 114 of the rotor 108, the lower wind velocity 120 strikes the blade 106. The striking of the higher wind velocity 118 on the blades 102, 104 leads to high aerodynamic loads acting on the blades 102, 104. Similarly, the striking of the lower wind velocity 120 on the blade 106 leads to low aerodynamic loads acting on the blade 106. It is noted that high wind velocities and low wind velocities for wind turbines are defined based on, inter alia, size and rated capacity of the wind turbines.

The wind turbine system 100 further includes a plurality of sensing devices 122 disposed at multiple locations on the wind turbine 101. The sensing devices 122, for example, may be similar to the sensing devices 23, 25, 27, 29, 31 (see FIG. 1). The sensing devices 122 generate aerodynamic signals 124 representative of the aerodynamic loads and/or measurement signals 126 of properties representative of the aerodynamic loads. The wind turbine system 100 further includes a turbine controller 128. The turbine controller 128 receives the aerodynamic signals 124 and the measurement signals 126 from the sensing devices 122. Furthermore, the turbine controller 128 processes the aerodynamic signals 124 and the measurement signals 126 to determine the aerodynamic loads acting on the blades 102, 104, 106. Particularly, the turbine controller 128 determines the high aerodynamic loads acting on the blades 102, 104 and the low aerodynamic loads acting on the blade 106 based upon the aerodynamic signals 124 and the measurement signals 126. In certain embodiments, the turbine controller 128 also determines locations of the high aerodynamic loads and the locations of the low aerodynamic loads. In one embodiment, the locations of the high aerodynamic loads and the locations of the low aerodynamic loads are determined based upon the aerodynamic signals 124, the measurement signals 126, identification numbers/names of the sensing devices 122, respective locations of the sensing devices 122, identification numbers/names of channels transferring the aerodynamic signals 124 and/or the measurement signals 126, or combinations thereof.

Subsequently, the turbine controller 128 may dynamically adjust the pitch angles of the blades 102, 104, 106 during the rotation of the rotor 108 based upon the high aerodynamic loads, the low aerodynamic loads, the locations of the high aerodynamic loads on the rotor 108, the locations of the low aerodynamic loads on the rotor 108, or combinations thereof. In the presently contemplated configuration, since the blades 102, 104 are acted upon by the high aerodynamic loads; the turbine controller 128 adjusts pitch angles of the blades 102, 104 towards feather. The adjustment of the pitch angles of the blades 102, 104 towards feather reduces an angle of attack on the locations of the high aerodynamic loads. In other words, the adjustment of the pitch angles of the blades 102, 104 reduces the angle of attack on the blades 102, 104 that are acted upon by the high aerodynamic loads. In the presently contemplated configuration, since the blade 106 is acted upon by the low aerodynamic loads; the turbine controller 129 either maintains a pitch angle of the blade 106 or adjusts the pitch angle of the blade 106 towards stall. In other words, the turbine controller 128 maintains the pitch angle of the blade 106 to maintain an angle of attack on the blade 106; or the turbine controller 128 adjusts the pitch angle of the blade 106 towards stall to increase the angle of attack on the blade 106.

In the presently contemplated configuration, the turbine controller 128 adjusts the pitch angles of the blades 102, 104, 106 at a time stamp T' based on the high aerodynamic loads, the low aerodynamic loads, the location of the high aerodynamic loads, and the location of the low aerodynamic loads acting on the rotor 108 at the time stamp T. The time stamp T' is T+$T_1$ where $T_1$ is minimal time delay in receiving the signals 124, 126, processing the signals 124, 126 to determine the high aerodynamic loads, the low aerodynamic loads, the locations of the high aerodynamic loads, the location of the low aerodynamic loads, and the like. The minimum time delay $T_1$, for example is in the range of milliseconds or microseconds. It is further noted that the turbine controller 128 dynamically adjusts the pitch angles of the blades 102, 104, 106 based upon the aerodynamic loads, the high aerodynamic loads, the low aerodynamic loads, the location of the high aerodynamic loads, and/or the location of the low aerodynamic loads. Accordingly, while the presently contemplated configuration explains the adjustment of the pitch angles at the time stamp T', the turbine controller 128 continuously adjusts the pitch angles of the blades 102, 104, 106 in each rotation based upon the aerodynamic loads, the high aerodynamic loads, the low aerodynamic loads, the location of the high aerodynamic loads, and/or the location of the low aerodynamic loads. Accordingly, the moment the aerodynamic loads on one or more of the blades 102, 104, 106 changes, the turbine controller 128 further adjusts the pitch angles of the one or more of the blades 102, 104, 106 based upon the changed aerodynamic loads. For example, at a time stamp $T_2$, when the blade 102 reaches (not shown in FIG. 2) the lower portion 114 of the rotor 108, the blade 102 is impacted by the low wind velocity 120, and hence the blade 120 will be impacted by low aerodynamic loads at the time stamp $T_2$. Accordingly, at the time stamp $T_2$, the turbine controller 128 may adjust the pitch angle of the blade 102 towards stall. The dynamic adjustment of the pitch angles of the blades 102, 104, 106 in each rotation based upon the aerodynamic loads, the high aerodynamic loads, the low aerodynamic loads, the location of the high aerodynamic loads, and/or the location of the low aerodynamic loads reduces the abnormal amplitude modulation of the wind turbine 101.

Figure 3:
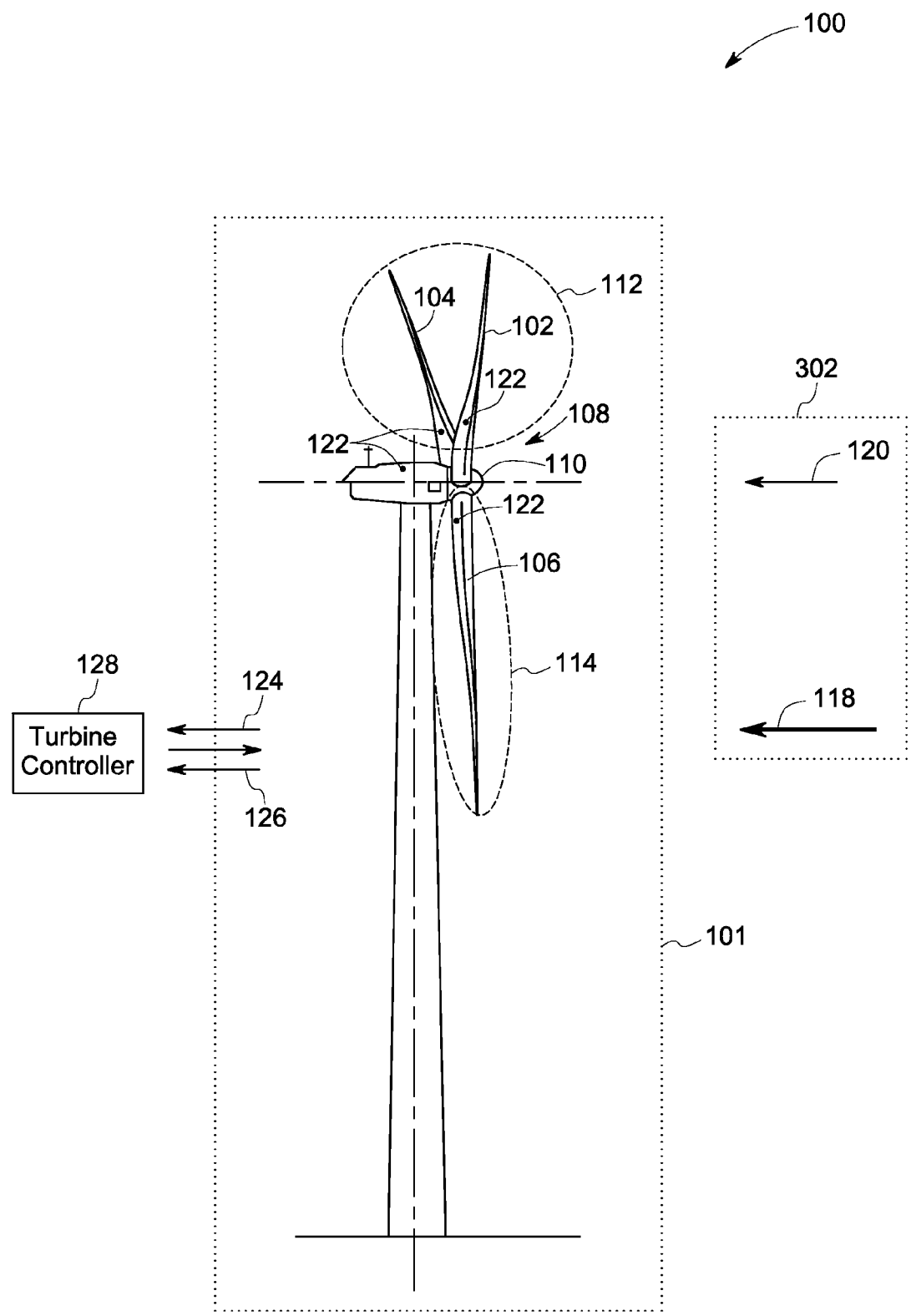
FIG. 3 is a perspective view of the wind turbine system referred to in FIG. 2 to explain adjustment of pitch angles of the blades, in accordance with another embodiment of the present systems.

FIG. 3 is a perspective view of the wind turbine system 100 (referred to in FIG. 2) to explain adjustment of pitch angles of the blades 102, 104, 106, in accordance with another embodiment of the present systems. FIG. 2 shows a position of the blades 102, 104, 106 at a time stamp $T_3$. In the presently contemplated configuration, the position of the blades 102, 104, 106 at the time stamp $T_3$ is similar to the position of blades 102, 104, 106 at the time stamp T shown with reference to FIG. 2. However, at the time stamp $T_3$, the rotor 108 is acted upon by a reverse wind shear 302. As used herein the term "reverse wind shear" refers to a wind shear that is formed due to a higher wind velocity directed towards a lower portion of a rotor, and a lower wind velocity directed towards an upper portion of the rotor. Accordingly, at the time stamp $T_3$, due to the reverse wind shear 302, the lower wind velocity 120 (see FIG. 2) strikes the upper portion 112 of the rotor 108, and the higher wind velocity 118 strikes the lower portion 114 of the rotor 108. The striking of the lower wind velocity 120 on the blades 102, 104 leads to low aerodynamic loads acting on the blades 102, 104. Furthermore, the striking of the higher wind velocity 118 on the blade 106 leads to high aerodynamic loads acting on the blade 106.

As previously noted with reference to FIG. 2, the sensing devices 122 generate the aerodynamic signals 124 and the measurement signals 126 that are received by the turbine controller 128. The turbine controller 128 determines the high aerodynamic loads and the low aerodynamic loads acting on the blades 102, 104, 106 based upon the aerodynamic signals 124 and/or the measurement signals 126. Furthermore, the turbine controller 128 determines the locations of the high aerodynamic loads, the locations of the low aerodynamic loads, or combinations thereof. In the presently contemplated configuration, the locations of the low aerodynamic loads include the blades 102, 104, and the locations of the high aerodynamic loads include the blade 106. Accordingly, the turbine controller 128 determines the locations of the low aerodynamic loads as the blades 102, 104. Furthermore, the turbine controller 128 determines the locations of the high aerodynamic loads as the blade 106. Furthermore, the turbine controller 128 adjusts the pitch angles of the blades 102, 104, 106 based upon the high aerodynamic loads, the low aerodynamic loads, the locations of the high aerodynamic loads, and the locations of the low aerodynamic loads. In the presently contemplated configuration, since the blade 106 is acted upon by the high aerodynamic loads, the turbine controller 128 adjusts the pitch angle of the blade 106 towards feather. Additionally, since in the presently contemplated configuration, the blades 102, 104 are acted upon by the low aerodynamic loads, the pitch angles of the blades 102, 104 are maintained constant. Alternatively, the pitch angles of the blades 102, 104 may be adjusted towards stall. It is noted that while in FIG. 2 and FIG. 3, the pitch angles of the blades 102, 104, 106 are adjusted based upon the aerodynamic loads, the high aerodynamic loads, the low aerodynamic loads, locations of high aerodynamic loads, the locations of low aerodynamic loads, or combinations thereof; in certain embodiments, the pitch angles of the blades 102, 104, 106 may be adjusted as a function of wind shear along with the aerodynamic loads, the high aerodynamic loads, the low aerodynamic loads, the locations of high aerodynamic loads, the locations of low aerodynamic loads, or combinations thereof.

Figure 4:
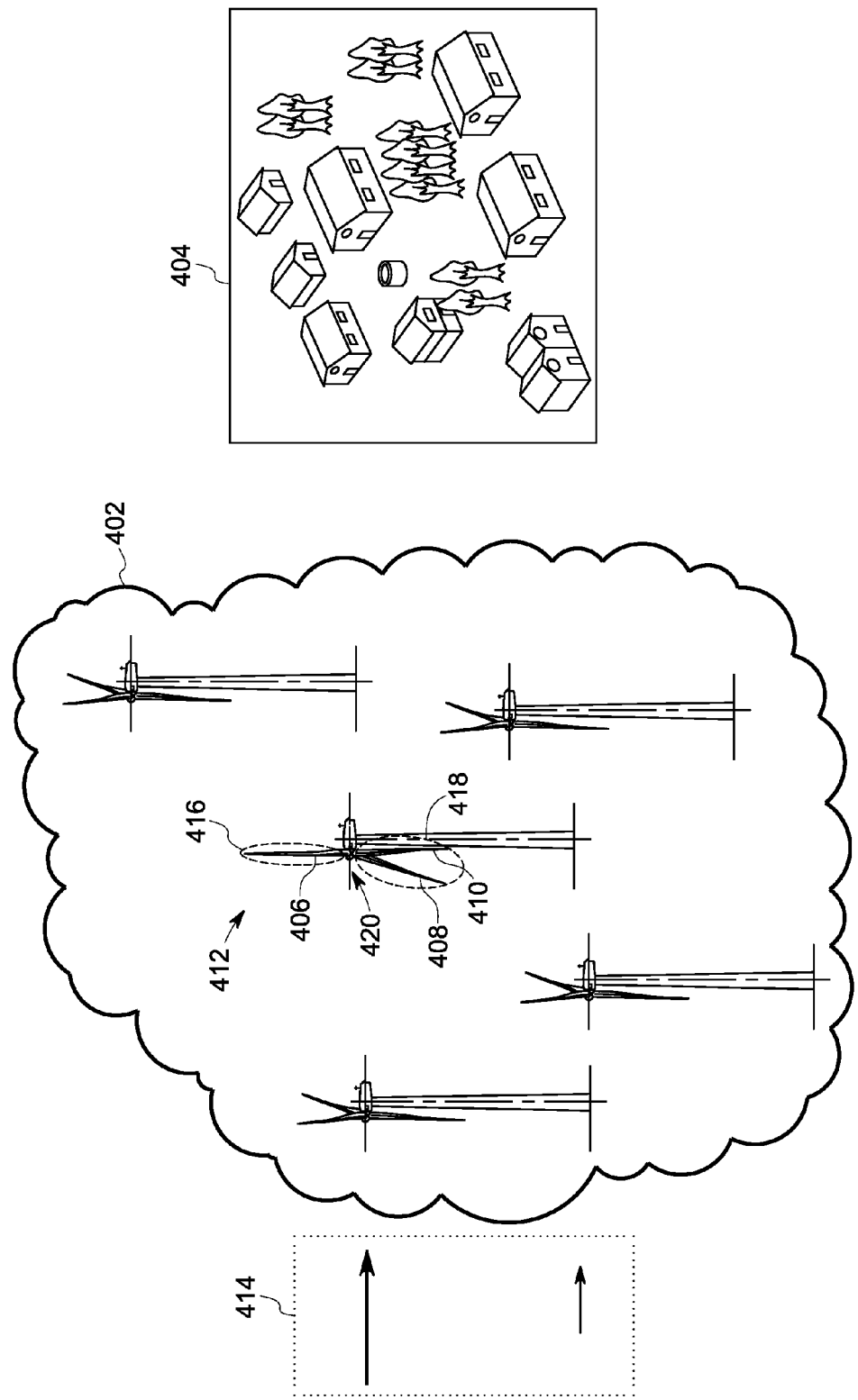
FIG. 4 shows a wind farm located at a distance from a habitation to describe adjustment of pitch angles of a plurality of blades of a wind turbine in the wind farm, in accordance with certain embodiments of the present systems.

FIG. 4 shows a wind farm 402 located at a distance from a habitation 404 to describe adjustment of pitch angles of a plurality of blades 406, 408, 410 of a wind turbine 412 in the wind farm 402, in accordance with certain embodiments of the present systems. As shown in FIG. 2, the wind farm 402 is located towards the left side (from viewer's perspective) of a habitation 404. The wind farm 402 includes a plurality of wind turbines along with the wind turbine 412. As previously noted, the wind turbine 412 includes the blades 406, 408, 410.

The wind turbine 412 further includes a plurality of sensing devices (not shown in FIG. 4) and a turbine controller (not shown in FIG. 4). The sensing devices, for example, may be similar to the sensing devices 23, 25, 27, 29, 31, 122 (see FIG. 1 and FIG. 2). Furthermore, the turbine controller 36, 128 (see FIG. 1 and FIG. 2). The wind turbine 412 is acted upon by standard logarithmic wind shear profile 414. Due to the standard logarithmic wind shear profile 414, the blade 406 is acted upon by high aerodynamic loads; and the blades 408, 410 are acted upon by low aerodynamic loads. The sensing devices generate aerodynamic signals (not shown) and/or measurement signals (not shown). The aerodynamic signals may be similar to the aerodynamic signals 124, and the measurement signals may be similar to the measurement signals 126 referred to in FIG. 2. The turbine controller receives the aerodynamic signals and the measurements signals. Furthermore, the turbine controller determines aerodynamic loads acting on the wind turbine 412 based upon the aerodynamic signals and/or the measurement signals. In one embodiment, the turbine controller determines the high aerodynamic loads, the low aerodynamic loads, the locations of the high aerodynamic loads and the locations of the low aerodynamic loads. In the presently contemplated configuration, the turbine controller determines the location of the high aerodynamic loads as the blade 406, and the location of the low aerodynamic loads as the blades 408, 410.

Furthermore, the wind turbine 412 includes a storage device (not shown) that is operationally coupled to the turbine controller. The storage device stores details of the habitation 404. For example, the details of the habitation includes a distance of the wind turbine 412 from the habitation 404, distance of the wind farm 402 from the habitation 404, a location of the habitation 404, a category of the habitation 404 (commercial or residential), operational time of the habitation (e.g. when habitation is commercial), and the like. In one embodiment, the turbine controller dynamically adjusts pitch angles of the blades 406, 408, 410 based upon the details of the habitation 404, the high aerodynamic loads, the low aerodynamic loads, the locations of the high aerodynamic loads, the locations of the low aerodynamic loads, positions of the blades 406, 408, 410 with respect to a location of the habitation 404, position of the wind farm 402 with respect to the location of the habitation 404, direction of wind, wind shear, or combinations thereof.

The positions of the blades 406, 408, 410 with respect to the location of the habitation 404, for example may include a noise-sensitive position or a noise-insensitive position. Similarly, the position of the wind farm 402 with respect to the location of the habitation 404 may be a noise sensitive or a noise-insensitive position. As used herein, the term "noise-sensitive position" is used to refer to a position of a blade that leads to substantial travelling of noise created by the blade/wind turbine to a habitation. As used herein, the term "noise-insensitive position" is used to refer to a position of a blade/wind turbine that leads to minimal travelling of noise created by the blade to a habitation. It is noted that same positions of the blades 406, 408, 410 are not necessarily always noise-sensitive or noise-insensitive; the positions of the blades 406, 408, 410 are noise-sensitive and/or noise-insensitive based upon a plurality of factors, such as, a direction of the wind 414, wind shear profile, the direction of rotation of the blades 406, 408, 410, the location of the habitation 404 with respect to the position of the blades 406, 408, 410, details of the habitation, or combinations thereof.

In the present non-limiting example, the habitation 404 is located in the downwind direction; and the blade 406 is positioned at an upper portion 416 of a rotor 420; the blade 406 is located in a noise sensitive position. Again in the present non-limiting example, the habitation 404 is located in the downwind direction; and the blades 408, 410 are located in a lower portion 418 of the rotor 420; the blades 408, 410 are positioned in a noise-insensitive position.

As previously noted, in the present non-limiting example, the blade 406 is acted upon by the high aerodynamic loads, and is positioned in a noise-sensitive position. Accordingly, in the present non-limiting example, the turbine controller may adjust the pitch angle of the blade 406 towards feather. Again as previously noted, in the present non-limiting example, the blades 408, 410 are acted upon by the low aerodynamic loads and are positioned in a noise-insensitive position; accordingly, the turbine controller may maintain the pitch angles of the blades 408, 410 as constant or change the pitch angles of the blades 408, 410 towards stall. In certain embodiments, when a blade A is acted upon by high aerodynamic loads, but the blade A is positioned in a noise-insensitive position, the turbine controller may maintain the pitch angle of the blade A as constant. In certain alternative embodiments, when a blade B is acted upon by low aerodynamic loads, and the blade B is positioned in a noise-sensitive position, the turbine controller may maintain the pitch angle of the blade B as constant. The dynamic adjustment of the pitch angles of the blades 406, 408, 410 based upon the details of the habitation 404, the high aerodynamic loads, the low aerodynamic loads, the locations of the high aerodynamic loads, the locations of the low aerodynamic loads, the positions (noise-sensitive position or noise-insensitive position) of the blades 406, 408, 410 with respect to the location of the habitation 404, or combinations thereof reduces the abnormal amplitude modulation of the wind turbine 412 at the habitation 404.

Figure 5:
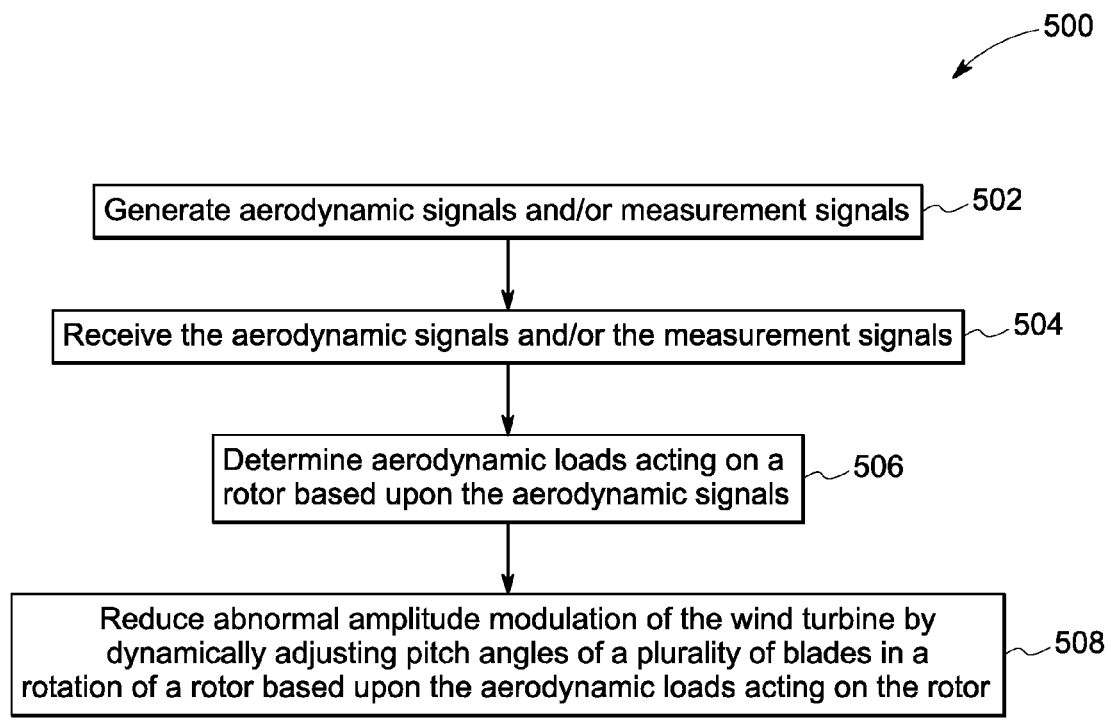
FIG. 5 is a flow chart illustrating an exemplary method for reducing the abnormal amplitude modulation of a wind turbine, in accordance with one embodiment of the present techniques.

FIG. 5 is a flow chart illustrating an exemplary method 500 for reducing the abnormal amplitude modulation of a wind turbine, in accordance with one embodiment of the present techniques. At step 502, aerodynamic signals representative of aerodynamic loads and/or measurement signals of properties representative of the aerodynamic loads may be generated. The aerodynamic signals, for example, may be the aerodynamic signals 124 referred to in FIG. 2. The measurement signals, for example, may be the measurement signals 126 referred to in FIG. 2. The signals, for example, may be generated by the sensing devices 23, 25, 27, 29, 31, 122 (see FIG. 1 and FIG. 2). At step 504, the aerodynamic signals and/or the measurement signals may be received by a turbine controller. The turbine controller, for example, may be the turbine controller 36, 128 (see FIG. 1 and FIG. 2). Furthermore, at step 506, aerodynamic loads acting on a rotor of the wind turbine may be determined based upon the aerodynamic signals and/or measurement signals. The aerodynamic loads, for example, may be determined by the turbine controller. At step 508, the abnormal amplitude modulation of the wind turbine is reduced by adjusting pitch angles of a plurality of blades during a rotation of the rotor of the wind turbine based upon the aerodynamic loads acting on the rotor. The dynamic adjustment of the pitch angles of the blades, for example, includes continuous adjustment of the pitch angles of the blades during the rotation of the rotor. The adjustment of the pitch angles of the blades during the rotation of the rotor, for example, includes collectively adjusting the pitch angles of the blades to alter an average of the pitch angles, adjusting the pitch angles of the plurality of blades to maintain the average of the pitch angles as constant, or a combination thereof.

Figure 6:
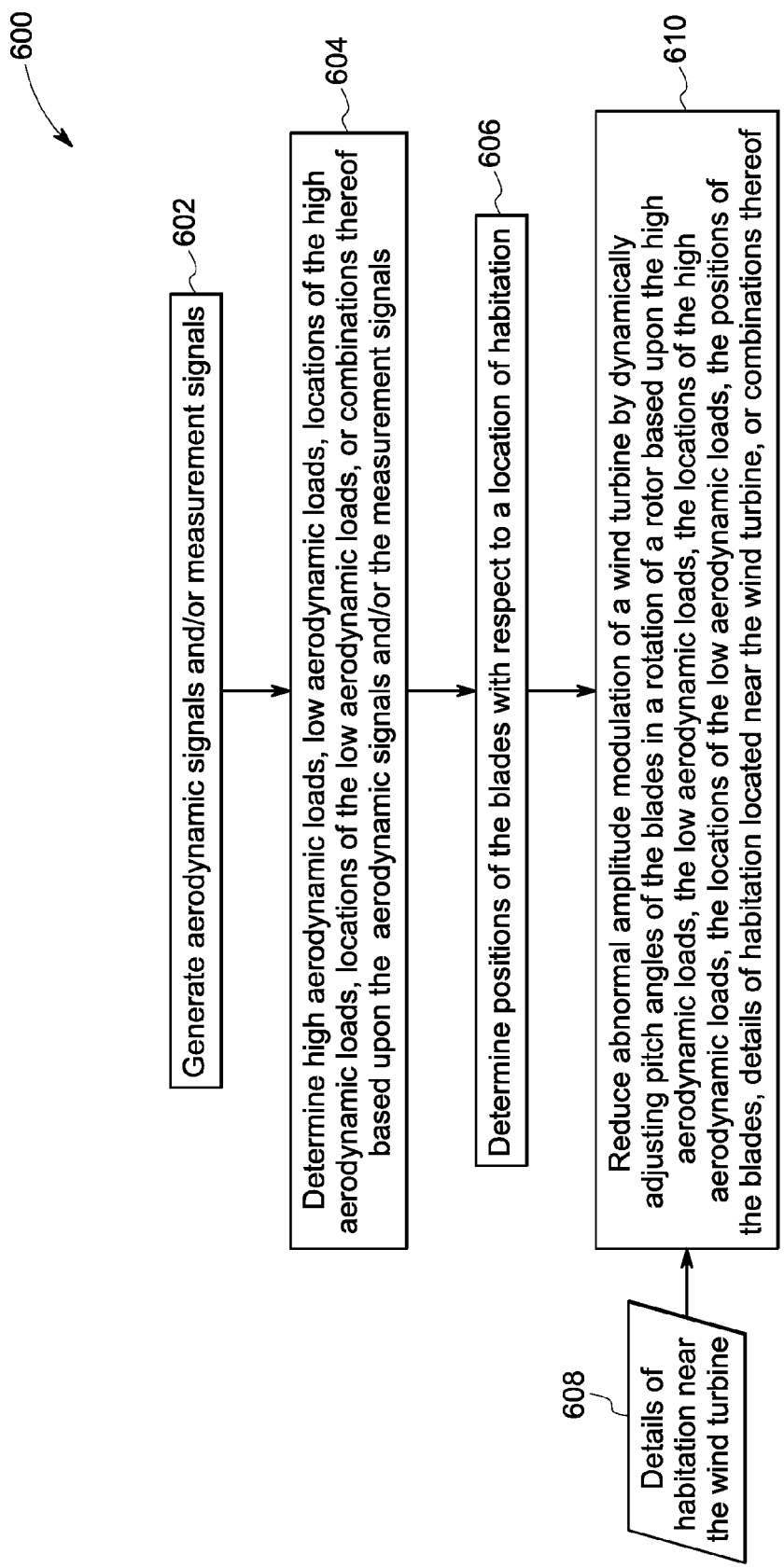
FIG. 6 is a flow chart that illustrates an exemplary method for reducing an abnormal amplitude modulation of a wind turbine, in accordance with certain embodiments of the present techniques.

FIG. 6 is a flow chart that illustrates an exemplary method 600 for reducing an abnormal amplitude modulation of a wind turbine, in accordance with certain embodiments of the present techniques. At step 602, aerodynamic signals representative of aerodynamic loads and/or measurement signals of properties representative of aerodynamic loads are generated. The aerodynamic signals, for example, may be the aerodynamic signals 124 referred to in FIG. 2. The measurement signals, for example, may be the measurement signals 126 referred to in FIG. 2. The aerodynamic signals and/or the measurement signals, for example, may be generated by the sensing devices 23, 25, 27, 29, 31, 122 (see FIG. 1 and FIG. 2). At step 604, high aerodynamic loads and low aerodynamic loads are determined based upon the aerodynamic signals and/or the measurement signals. Furthermore, at step 604, locations of the high aerodynamic loads and locations of the low aerodynamic loads may be determined. The locations of the high aerodynamic loads and the locations of the low aerodynamic loads are determined based upon the aerodynamic signals and/or the measurement signals, identifications numbers/names of channels that transfer the aerodynamic signals and/or the measurement signals, identification numbers/names of the sensing devices, or combinations thereof. At step 606, positions of the blades/wind turbine with respect to a location of habitation may be determined. As previously noted with reference to FIG. 4, the positions of the blades/wind turbine may include a noise-sensitive position or a noise-insensitive position. Reference numeral 608 is representative of details of the habitation located at a distance from the wind turbine. The details of the habitation, for example, may include a distance of the wind turbine from the habitation, a location of the habitation, a category of the habitation (commercial or residential), operational time of the habitation (when commercial), and the like. Furthermore, at step 610, the abnormal amplitude modulation of the wind turbine is reduced by dynamically adjusting pitch angles of the blades during a rotation of the rotor based upon the high aerodynamic loads, the low aerodynamic loads, the locations of the high aerodynamic loads, the locations of the low aerodynamic loads, the positions of the blades, the details of the habitation 608, or combinations thereof. The dynamic adjustment of the pitch angles of the blades reduces the abnormal amplitude modulation of the blades irrespective of the location of the habitation, distance of the habitation from the wind farm and the wind turbine, category of wind shear (standard logarithmic wind shear profile, low wind shear, side wind shear, high wind shear, low wind shear etc.), direction of wind, or combinations thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
    a rotor comprising a plurality of blades and a hub;
    at least one sensing device for generating signals representative of aerodynamic loads acting on the rotor; and
    a turbine controller communicatively coupled to the at least one sensing device and configured to reduce an abnormal amplitude modulation of the wind turbine by dynamically adjusting pitch angles of the plurality of blades during a rotation of the rotor based upon the signals representative of the aerodynamic loads acting on the rotor by:
    determining high aerodynamic loads, low aerodynamic loads, locations of the high aerodynamic loads on the rotor, and locations of the low aerodynamic loads on the rotor; and
    dynamically adjusting the pitch angles of the plurality of blades during the rotation of the rotor based upon one of the high aerodynamic loads, the low aerodynamic loads, the locations of the high aerodynamic loads on the rotor, the locations of the low aerodynamic loads on the rotor, and combinations thereof.

2. The wind turbine system of claim 1, wherein the turbine controller is configured to dynamically adjust the pitch angles of the plurality of blades by collectively adjusting the pitch angles of the plurality of blades to alter an average of the pitch angles or adjusting the pitch angles of the plurality of blades to maintain the average of the pitch angles as constant during the rotation of the rotor.

3. The wind turbine system of claim 1, wherein the dynamically adjusting the pitch angles of the plurality of blades during the rotation of the rotor based upon the high aerodynamic loads, the low aerodynamic loads, the locations of the high aerodynamic loads on the rotor, the locations of the low aerodynamic loads on the rotor, and combinations thereof, reduces an angle of attack on the locations of the high aerodynamic loads, and maintains constant or increases an angle of attack on the locations of the low aerodynamic loads.

4. The wind turbine system of claim 1, wherein the turbine controller is configured to dynamically adjust the pitch angles of the plurality of blades by adjusting the pitch angles of the plurality of blades based upon wind shear at a time stamp, details of a habitation located at a distance from the wind turbine system, positions of the plurality of blades with respect to a location of the habitation at the time stamp, and combinations thereof, wherein the turbine controller is further configured to determine the positions of the plurality of blades, and wherein the positions of the plurality of blades with respect to the location of the habitation at the time stamp comprises a noise-sensitive position and a noise-insensitive position.

5. The wind turbine system of claim 4, wherein the turbine controller is configured to adjust the pitch angles of the plurality of blades by changing a pitch angle of one or more of the plurality of blades towards feather when the one or more of the plurality of blades is acted upon by the high aerodynamic loads at the time stamp, and a position of the one or more of the plurality of blades at the time stamp during the rotation is the noise-sensitive position.

6. The wind turbine system of claim 4, wherein the noise-sensitive position comprises the position of the one or more of the plurality of blades that leads to substantial travelling of noise created by the one or more of the plurality of blades to the habitation.

7. The wind turbine of claim 4, wherein the position of the one or more of the plurality of blades is the noise-sensitive position or the noise-insensitive position based upon a plurality of factors comprising a direction of wind, a direction of rotation of the blade, the location of the habitation with respect to the position of the blade, the location of the habitation with respect to a position of a wind turbine having the blade, details of the habitation, or combinations thereof.

8. The wind turbine system of claim 4, wherein the turbine controller is configured to adjust the pitch angles of the plurality of blades by changing a pitch angle of one or more of the plurality of blades towards stall when the one or more of the plurality of blades is acted upon by the low aerodynamic loads, and the position of the one or more of the plurality of blades at the time stamp during the rotation is the noise-insensitive position.

9. The wind turbine system of claim 4, wherein the turbine controller is configured to adjust the pitch angles of the plurality of blades by maintaining a pitch angle as constant or minimally changing the pitch angle of one or more of the plurality of blades towards feather when the one or more of the plurality of blades is acted upon by the high aerodynamic loads, and the position of the one or more of the plurality of blades at the time stamp during the rotation is the noise-insensitive position.

10. The wind turbine system of claim 4, wherein the turbine controller is configured to dynamically adjust the pitch angles of the plurality of blades by maintaining a pitch angle of one or more of the plurality of blades as constant or minimally decreasing the pitch angle of the one or more of the plurality of blades towards stall when the one or more of the plurality of blades is acted upon by the low aerodynamic loads, and the position of the one or more of the plurality of blades at the time stamp during the rotation is the noise-sensitive position.

11. The wind turbine system of claim 1, wherein the at least one sensing device comprises a proximity sensor, a pressure sensor, a stall flaps sensor, a wool tufts sensor, a strain gauge sensor, a vibe optic sensor, a radio sensor or a sensor that measures displacement or strain of a main shaft in the wind turbine using sensor technologies based on acoustic, optical, magnetic, capacitive or inductive field effects.

12. The wind turbine system of claim 1, wherein the signals generated by the at least one sensing device representative of aerodynamic loads acting on the rotor comprise bending moments of the plurality of blades, deflection of the plurality of blades, load acting on the hub of the wind turbine, deformation of the hub, bending moments of a main shaft in the wind turbine, deflection of the main shaft, and a distance between a flange of the main shaft in the wind turbine and a reference surface.

13. A method, comprising:
receiving signals representative of aerodynamic loads acting on a rotor of a wind turbine;
reducing abnormal amplitude modulation of the wind turbine by dynamically adjusting pitch angles of a plurality of blades during a rotation of the rotor based upon the signals representative of the aerodynamic loads acting on the rotor;
determining high aerodynamic loads, low aerodynamic loads, locations of the high aerodynamic loads on the rotor, and locations of the low aerodynamic loads on the rotor during the rotation at a time stamp;
determining positions of the plurality of blades at the time stamp during the rotation with respect to a location of a habitation near the wind turbine; and
dynamically adjusting the pitch angles of the plurality of blades during the rotation of the rotor based upon the high aerodynamic loads, the low aerodynamic loads, the locations of the high aerodynamic loads, the locations of the low aerodynamic loads, the positions of the plurality of blades, details of the habitation located at a distance from the wind turbine, or combinations thereof.

* * * * *